US010067036B2

(12) United States Patent
Imamura et al.

(10) Patent No.: US 10,067,036 B2
(45) Date of Patent: Sep. 4, 2018

(54) TIRE INSPECTION DEVICE AND TIRE POSTURE DETECTION METHOD

(71) Applicant: MITSUBISHI HEAVY INDUSTRIES MACHINERY SYSTEMS, LTD., Hyogo (JP)

(72) Inventors: Morihiro Imamura, Hiroshima (JP); Hiroaki Yoneda, Hiroshima (JP); Kunio Matsunaga, Hiroshima (JP); Makoto Tachibana, Hiroshima (JP)

(73) Assignee: MITSUBISHI HEAVY INDUSTRIES MACHINERY SYSTEMS, LTD., Hyogo (JP)

( * ) Notice: Subject to any disclaimer, the term of this patent is extended or adjusted under 35 U.S.C. 154(b) by 105 days.

(21) Appl. No.: 15/108,576

(22) PCT Filed: Feb. 24, 2015

(86) PCT No.: PCT/JP2015/055117
§ 371 (c)(1),
(2) Date: Jun. 28, 2016

(87) PCT Pub. No.: WO2016/135839
PCT Pub. Date: Sep. 1, 2016

(65) Prior Publication Data
US 2017/0003198 A1    Jan. 5, 2017

(51) Int. Cl.
*G01M 17/02*    (2006.01)
(52) U.S. Cl.
CPC .......... *G01M 17/022* (2013.01); *G01M 17/02* (2013.01); *G01M 17/021* (2013.01)

(58) Field of Classification Search
CPC .. G01M 17/02; G01M 17/021; G01M 17/022; H02B 13/0356
See application file for complete search history.

(56) References Cited

U.S. PATENT DOCUMENTS

2005/0018875 A1    9/2005  Cargould et al.
2005/0188755 A1*   9/2005  Cargould ............ G01M 17/021
                                                      73/146

(Continued)

FOREIGN PATENT DOCUMENTS

CN    102161337 A    8/2011
JP    62-211300 A    9/1987

(Continued)

OTHER PUBLICATIONS

International Search Report in PCT Application No. PCT/JP2015/055117, dated May 19, 2015.

(Continued)

*Primary Examiner* — Randy Gibson
*Assistant Examiner* — Gedeon M Kidanu
(74) *Attorney, Agent, or Firm* — Kanesaka Berner and Partners LLP

(57) ABSTRACT

A tire inspection device according to the present invention includes a support portion which supports a tire such that a center axis of the tire is positioned along a vertical direction, a lifting and lowering portion which moves the tire and a rim relative to each other in the vertical direction to fit the rim to the tire, a position detection unit which detects a position of a surface of the tire in the vertical direction at three or more detection points, and a posture detection unit which detects posture information of the tire based on position information detected by the position detection unit.

6 Claims, 7 Drawing Sheets

(56) References Cited

U.S. PATENT DOCUMENTS

| | | | |
|---|---|---|---|
| 2007/0220964 A1 | 9/2007 | Shinomoto et al. | |
| 2011/0203362 A1* | 8/2011 | Imamura | G01M 17/021 73/146 |
| 2014/0060181 A1* | 3/2014 | Tachibana | B60C 19/00 73/460 |

FOREIGN PATENT DOCUMENTS

| | | |
|---|---|---|
| JP | 7-122895 A | 5/1995 |
| JP | 9-297086 A | 11/1997 |
| JP | 3404217 B2 | 5/2003 |
| JP | 2011-169768 A | 9/2011 |
| TW | 201335583 A1 | 9/2013 |

OTHER PUBLICATIONS

Written Opinion in PCT Application No. PCT/JP2015/055117, dated May 19, 2015.

Office Action in TW Application No. 104106671, dated Feb. 25, 2016.

\* cited by examiner

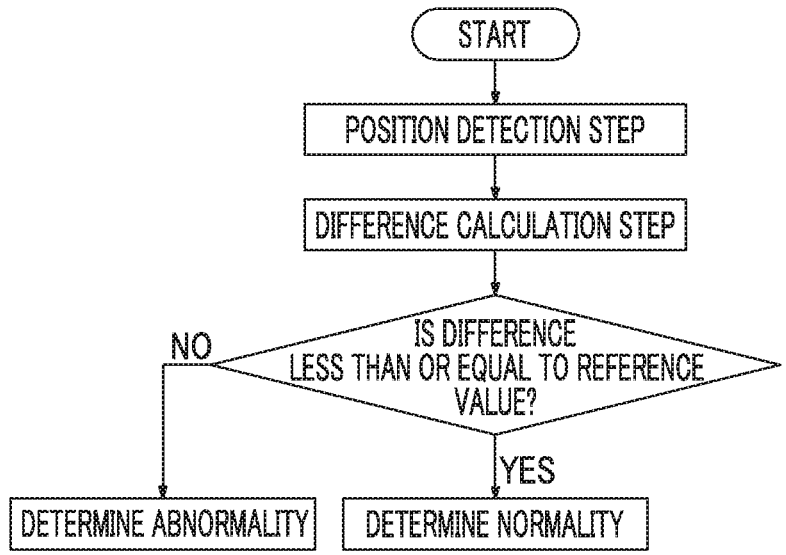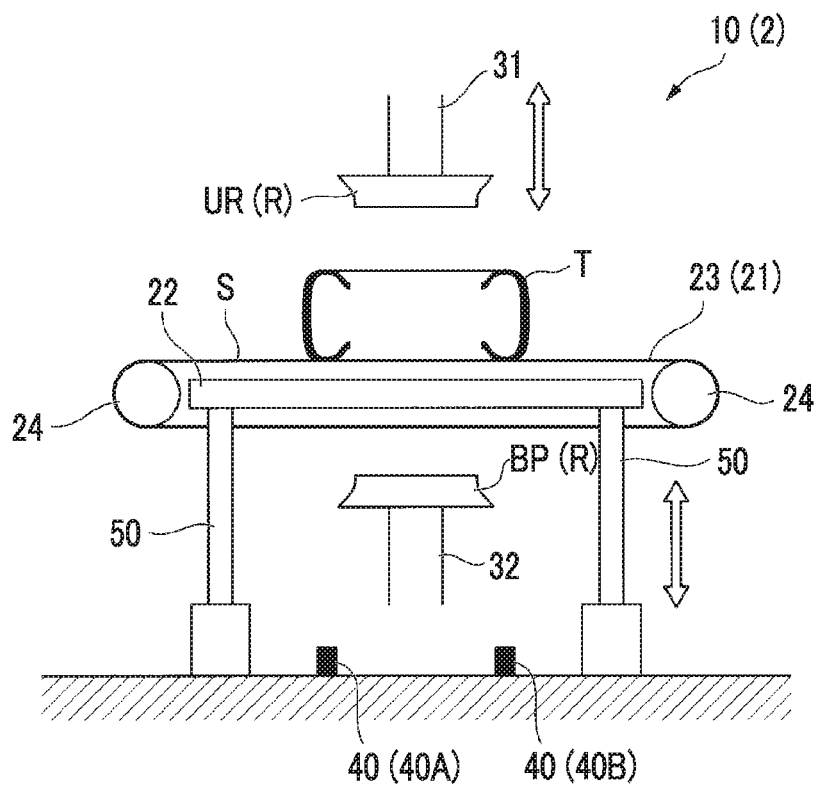

TIRE INSPECTION DEVICE AND TIRE POSTURE DETECTION METHOD

TECHNICAL FIELD

The present invention relates to a tire inspection device and a tire posture detection method.

BACKGROUND ART

In a case where a rubber tire which is used in a vehicle or the like is manufactured, in order to secure quality thereof, various inspections are performed by an inspection device in a state where a tire is pseudo-expanded (air-inflated). Specifically, by fitting a tire to a member which is referred to as a pseudo rim and simulates a wheel, the inner portion of tire is in an airtight state, and the inner portion is filled with air. The pseudo rim is divided into an upper rim and a lower rim. Conveniently, in a case where a plurality of tires are continuously inspected, since the plurality of tires are transported in a posture in which a rotation axis of each of the tires is positioned in a vertical direction, each of the upper rim and the lower rim is fitted from both sides in an upward-downward direction of the tire. That is, the tire is inspected in a state where both side walls of the tire face the vertical direction.

As an example of the above-described technology, a device described in PTL 1 is disclosed. A tire inspection device described in PTL 1 includes a belt conveyor which transports a tire, a lifter which lifts and lowers the belt conveyor, an upper spindle which supports an upper rim, and a lower spindle which supports a lower rim. First, the belt convey is lowered by the lifter, and thus, the lower rim is fitted to the tire from the lower side of the tire. Subsequently, the upper spindle is lowered, and thus, the upper rim is fitted to the tire. That is, the upper spindle and the lower spindle are disposed to be coaxial with an axial center position of the tire. After the upper rim and the lower rim are fitted, the tire is filled with air.

CITATION LIST

Patent Literature

[PTL 1] Japanese Unexamined Patent Application Publication No. 2011-169768

SUMMARY OF INVENTION

Technical Problem

However, in the device described in PTL 1, when the tire is transported by the belt conveyor, in a case where the axial center position of the tire and an axis of the lower spindle (or the upper spindle) are deviated from each other (misalignment occurs), the rim and the tire may not be appropriately fitted to each other. More specifically, in a case where the tire is displaced on the belt conveyor due to vibration, sliding, or the like while the tire is transported by the belt conveyor, the misalignment easily occurs. If the lower rim and the upper rim are fitted to the tire in the state where the misalignment occurs, since the tire is crushed from above or below by the rim, deterioration or damage of the tire is likely to occur.

The present invention is made in consideration of the above-described circumstances, and an object thereof is to provide a tire inspection device and a tire posture detection method capable of preventing inappropriate fitting between the tire and the rim by detecting a posture change of the tire.

Solution to Problem

In order to achieve the above-described object, the present invention adopts the following means.

According to a first aspect, there is provided a tire inspection device, including: a support portion which supports a tire such that a center axis of the tire is positioned along a vertical direction; a lifting and lowering portion which moves the tire and a rim relative to each other in the vertical direction to fit the rim to the tire; a position detection unit which detects a position of a surface of the tire in the vertical direction at three or more detection points; and a posture detection unit which detects posture information of the tire based on position information detected by the position detection unit.

According to the above-described configuration, when the rim is fitted to the tire, the position detection unit detects the position information in the vertical direction at the detection points on the surface of the tire. The posture detection unit can detect the posture information of the tire based on the position information. Accordingly, it is possible to change an operation state of the tire inspection device according to the change in the posture of the tire. Particularly, in the above-described configuration, the position information is detected at three or more detection points on the surface of the tire. Accordingly, it is possible to detect inclination of the tire with respect to the support portion as the change in the posture.

According to a second aspect, in the tire inspection device according to the first aspect, the position detection unit may be provided in a region on one side in the center axis direction of the tire, and may detect the position information in a state where the position detection unit does not come into contact with the detection point.

According to the above-described configuration, since the position detection unit is provided in the region on one side in the center axis direction of the tire, when the tire and the rim are moved relative to each other by the lifting and lowering portion, it is possible to detect the position information of the tire in the vertical direction with high accuracy. In addition, since the position detection unit detects the position information in the state where the position detection unit does not come into contact with the detection point of the tire, even while the tire and the rim move relative to each other, it is possible to appropriately detect the position information.

According to a third aspect, in the tire inspection device according to the first or second aspect, when viewed from the vertical direction, the position detection unit may be provided at a position which is positioned inside an outer circumferential edge of the tire and outside an outer circumferential edge of the rim, and the detection point may be positioned on a side wall which is a surface facing the center axis direction in the tire.

According to the above-described configuration, the position detection unit is provided in the region which is positioned inside the outer circumferential edge of the tire and outside the outer circumferential edge of the rim. In addition, based on this position, the position information of the detection point on the side wall of the tire is detected by the position detection unit. Accordingly, the position detection unit can detect the positional change of the tire in the vertical direction with higher accuracy.

According to a fourth aspect, in the tire inspection device according to any one of the first to third aspects, the position detection unit may be integrally provided with the support portion, and the posture detection unit may include: a difference calculation unit which calculates a difference of the position information for each detection point before and after a relative movement between the tire and the rim; and a determination unit which compares the difference for each detection point and a predetermined reference value with each other, determines that the tire is in a normal posture in a case where the difference is smaller than the reference value and generates a normal signal as the posture information, and determines that the tire is in an abnormal posture in a case where the difference is greater than the reference value and generates an abnormal signal as the posture information.

According to the above-described configuration, the rim is fitted to the tire according to the relative movement between the rim and the tire on the support portion, and the posture of the tire is changed. As a result, in a case where abnormal posture occurs, displacement (difference) occurs in the position of the tire with respect to the position detection unit. The difference calculation unit calculates the difference of the position information at three or more detection points before and after the relative movement. In the determination unit, this difference and the reference value are compared with each other. In the case where the difference of the position information at each detection point (that is, the surface of the tire) is smaller than all reference values, the determination unit determines that inclination does not occur in the tire, and the normal signal is generated as the posture information of the tire.

Meanwhile, in the case where the difference of the position information is greater than the reference value at one or more detection point, when the rim and the tire are fitted to each other, it is determined that the change in the posture such as inclination is generated in the tire. Accordingly, the determination unit determines that the tire is in an abnormal posture, and generates the abnormal signal as the posture information of the tire.

According to a fifth aspect, in the tire inspection device according to any one of the first to fourth aspects, the position detection unit may be fixed at a position which is separated from the support portion and is different from the position of the support portion, and the posture detection unit may include: a difference calculation unit which calculates a difference of the position information for each detection point before and after a relative movement between the tire and the rim; and a determination unit which compares the difference for each detection point and a predetermined reference value with each other, determines that the tire is in a normal posture in a case where the difference is smaller than the reference value and generates a normal signal as the posture information, and determines that the tire is in an abnormal posture in a case where the difference is greater than the reference value and generates an abnormal signal as the posture information.

According to the above-described configuration, the rim is fitted to the tire according to the relative movement between the rim and the tire on the support portion, and the posture of the tire is changed. As a result, in a case where abnormal posture occurs, displacement (difference) occurs in the position of the tire with respect to the position detection unit. The difference calculation unit calculates the difference of the position information at three or more detection points before and after the relative movement. In the determination unit, this difference and the reference value are compared with each other. In the case where the difference of the position information at each detection point (that is, the surface of the tire) is smaller than all reference values, the determination unit determines that inclination does not occur in the tire, and the normal signal is generated as the posture information of the tire.

Meanwhile, in a case where the difference of the position information is greater than the reference value at one or more detection point, when the rim and the tire are fitted to each other, it is determined that the change in the posture such as inclination is generated in the tire. Accordingly, the determination unit determines that the tire is in an abnormal posture, and generates the abnormal signal as the posture information of the tire.

According to a sixth aspect of the present invention, there is provided a tire posture detection method, which detects a posture change of a tire when the tire supported by a support portion such that a center axis of the tire is positioned along a vertical direction, and a rim fitted to the tire move relative to each other in the vertical direction, by a position detection unit which is provided integrally with the support portion, including: a step of detecting a plurality of position information by detecting a separation distance between the tire and the position detection unit during the relative movement at three or more detection points on the tire; a step of calculating a difference between the plurality of position information for each detection point before and after the relative movement; and a step of comparing the difference for each detection point and a predetermined reference value with each other, determining that the tire is in a normal posture in a case where the difference is smaller than the reference value, and determining that the tire is in an abnormal posture in a case where the difference is greater than the reference value.

According to this method, first, the separation distance between the position detection unit and the tire which is generated by the relative movement between the rim and the tire on the support portion is detected. Next, after the difference of the position information for each detection point before and after the relative movement is detected, this difference and the reference value are compared with each other. In the case where the difference is smaller than the reference value, it can be determined that the detection points (that is, the surface of the tire) are positioned at substantially equal distances from the position detection units. Accordingly, it is determined that inclination does not occur in the tire. That is, it can be determined that the tire is in a normal posture.

Meanwhile, in a case where the difference of the position information for each detection point is greater than the reference value, when the rim and the tire are fitted to each other, it is determined that the change in the posture such as inclination is generated in the tire. Accordingly, it can be determined that the tire is in an abnormal posture.

According to a seventh aspect of the present invention, there is provided a tire posture detection method, which detects a posture change of a tire when the tire supported by a support portion such that a center axis of the tire is positioned along a vertical direction, and a rim fitted to the tire move relative to each other in the vertical direction, by a position detection unit which is provided at a position which is separated from the support portion and is different from the position of the support portion, including: a step of detecting a plurality of position information by detecting a separation distance between the tire and the position detection unit during the relative movement at three or more detection points on the tire; a step of calculating a difference between the plurality of position information for each detection point before and after the relative movement; and a step of comparing the difference for each detection point and a predetermined reference value with each other, determining that the tire is in a normal posture in a case where the difference is smaller than the reference value, and determining that the tire is in an abnormal posture in a case where the difference is greater than the reference value.

According to this method, first, the separation distance between the position detection unit and the tire which is generated by the relative movement between the rim and the tire on the support portion is detected. Next, after the difference of the position information for each detection point before and after the relative movement is detected, this difference and the reference value are compared with each other. In the case where the difference is smaller than the reference value, it can be determined that the detection points (that is, the surface of the tire) are positioned at substantially equal distances from the position detection units. Accordingly, it is determined that inclination does not occur in the tire. That is, it can be determined that the tire is in a normal posture.

Meanwhile, in the case where the difference of the position information for each detection point is greater than the reference value, when the rim and the tire are fitted to each other, it is determined that the change in the posture such as inclination is generated in the tire. Accordingly, it can be determined that the tire is in an abnormal posture.

Advantageous Effects of Invention

According to the tire inspection device and the tire posture detection method of the present invention, it is possible to prevent inappropriate fitting between the tire and the rim by detecting the posture change of the tire.

BRIEF DESCRIPTION OF DRAWINGS

FIG. 8 is a flowchart showing each step of a tire posture detection method according to the first embodiment of the present invention.

FIG. 9 is a view showing a tire inspection device according to a second embodiment of the present invention.

DESCRIPTION OF EMBODIMENTS

First Embodiment

A tire inspection device 10 and a tire posture detection method according to a first embodiment of the present invention are described with reference to the drawings. The tire inspection device 10 is a device for inspecting quality or characteristics of a rubber tire T used in a vehicle or the like in a state where conditions actually used are simulated.

Figure 1:
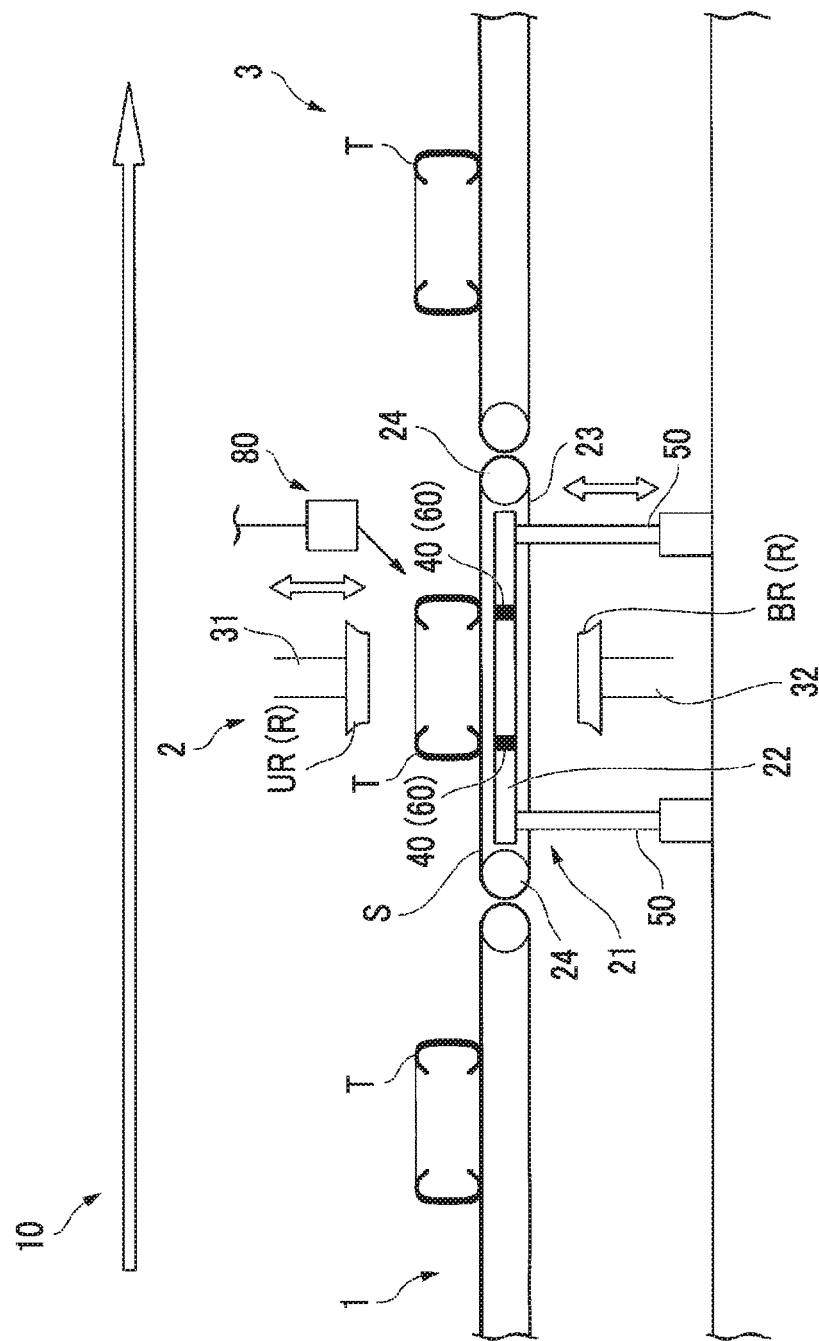
FIG. 1 is an overall view of a tire inspection device according to each embodiment of the present invention.

Specifically, as shown in FIG. 1, the tire inspection device 10 according to the present embodiment includes a carrying-in portion 1 which carries in a tire T which is an inspection object, an inspection portion 2 which is provided so as to be adjacent to the downstream side in a transport direction of the carrying-in portion 1, and a carrying-out portion 3 which is provided on the downstream side of the inspection portion 2.

The carrying-in portion 1 is a belt conveyor which transports the tire T which is manufactured by equipment (not shown) to inspection portion 2. In the inspection portion 2, the tire T transported from the carrying-in portion 1 is mounted on a rim R. Subsequently, in the inspection portion 2, after air is injected into the tire, on which the rim R is mounted, by an air inflator 80, quality or characteristics of the tire T are inspected by various measurement devices (not shown).

Hereinafter, a configuration of the inspection portion 2 is described with reference to FIGS. 1 to 8.

As shown in FIG. 1, the inspection portion 2 includes a support portion 21, an upper spindle 31, a lower spindle 32, a position detection unit 40, a lifting and lowering portion 50, and a posture detection unit 60.

(Support Portion 21)

Figure 2:
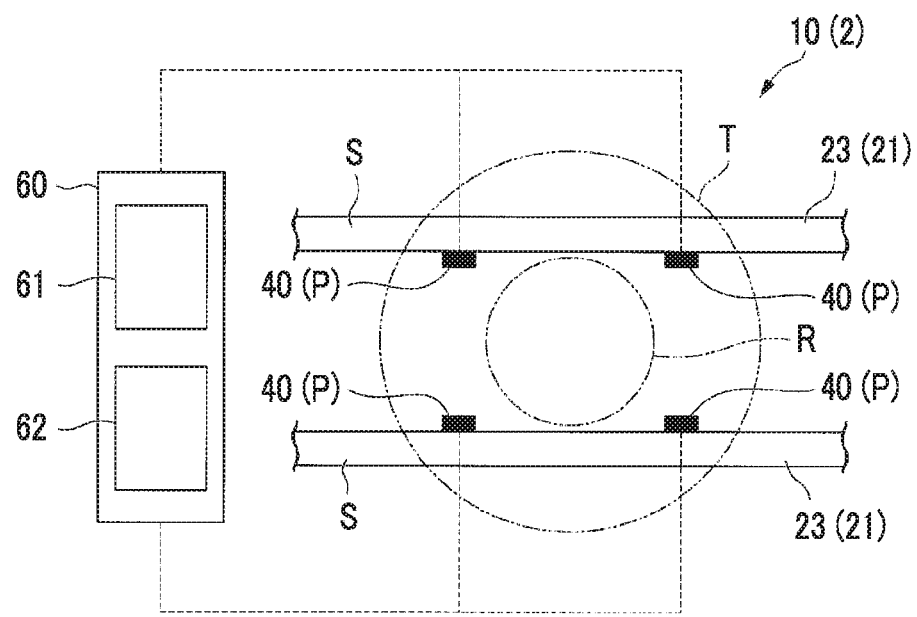
FIG. 2 is a plan view of the tire inspection device according to each embodiment of the present invention.

The support portion 21 is a belt conveyor which supports the tire T, which is transported from the carrying-in portion 1, from the lower side. Before and after inspection, the support portion 21 transports the tire T in one direction (hereinafter, referred to as a transport direction) on a substantially horizontal surface. More specifically, as shown in FIGS. 1 and 2, the support portion 21 includes two belt portions 23 on which the tire T is placed, two roller portions 24 which support the belt portions 23 on both sides in the transport direction, and a support portion main body 22 which supports the roller portions 24 and is connected to the lifting and lowering portions 50 described below.

Two belt portions 23 are stretched between the roller portions 24 which are provided on both sides in the transport direction. Each of the roller portions 24 is a columnar member which extends along a rotation axis approximately orthogonal to the transport direction of the belt portion 23. More specifically, the roller portions are rotatably supported by the support portion main body 22 which extends in the transport direction. The roller portions 24 are rotationally driven by a drive source (not shown). Accordingly, two belt portions 23 rotate in the same direction (transport direction) as each other.

In addition, two belt portions 23 are disposed so as to be parallel with each other in the transport direction. The belt portions 23 are separated from each other with a constant distance in the entire transport direction. More specifically, the belt portions 23 are positioned outside from an outer diameter of the rim R described below such that the belt portions 23 and the rim R do not interfere with each other.

Out of both surfaces of the support portion 21 in a vertical direction, a surface (that is, upper surface) of a side on which the tire T is placed is a placement surface S. In a state where the placement surface S does not follow lifting and lowering performed by the lifting and lowering portion 50 described below, the placement surface S is positioned at a position which is substantially the same as those of the carrying-in portion 1 and an upper surface of a carrying-out surface.

The tire T which is an inspection object is placed on the placement surface S in a state where side walls of the tire T face an upward-downward direction. Here, each of the side walls is an approximately tubular surface which extends in a direction intersecting the center axis (tire axis OT) of the tire T. In other words, the tire T is supported in a state where the center axis thereof is positioned along the vertical direction.

(Upper Spindle 31 and Lower Spindle 32)

In addition, the rims R held by the upper spindle 31 and the lower spindle 32 are fitted to the tire T supported by the support portion 21. Here, the rims R according to the present embodiment are divided into an upper rim UR and a lower rim BR from the upper side toward the lower side in the vertical direction. Each of the upper rim UR and the lower rim BR is formed in an approximately annular shape, and imitates a wheel of the tire T. In descriptions below, in order to distinguish the center axis of the rim R from the tire axis OT, the center axis of the rim R is referred to as a rim axis OR. Each of the rims R (upper rim UR and lower lime BR) is fitted to a bead portion Tb (that is, an end edge in the inner diameter side in the center axis) of the tire T from the upward-down direction on the rim axis OR.

The upper rim UR configured as described above is held by the upper spindle 31 above the support portion 21. Meanwhile, the lower rim BR is held by the lower spindle 32 below the support portion 21. More specifically, each of the upper spindle 31 and the lower spindle 32 is disposed on the upper side and the lower side with respect to the support portion 21 on the rim axis OR. Even when it is described in more detail, the upper spindle 31 can be lifted and lowered in the vertical direction. In addition, when inspection is performed after the rim R is fitted to the tire T, the upper spindle 31 and the lower spindle 32 are rotationally driven in the same rotation direction as each other around the rim axis OR by an external drive source (not shown).

Moreover, the two belt portions 23 of the above-described support portion 21 are set so as to be sufficiently larger than the outer diameter of the rim R such that the two belt portions 23 do not interfere with the rim R. In addition, even when it is not shown in detail, in order to cope with various tires T and rims R having dimensions different from each other, a separation distance between the two belt portions 23 is configured so as to be appropriately changed. That is, in a case where the tire T (and the rim corresponding to the tire T) having a relatively large diameter is inspected, the distance between the two belt portions 23 is adjusted so as to be increased. Meanwhile, in a case where the tire T (and the rim R corresponding to the tire T) having a relatively small diameter is inspected, the distance between the two belt portions 23 is adjusted so as to be decreased.

(Lifting and Lowering Portion 50)

The lifting and lowering portion 50 is provided on the support portion 21 configured as described above. The lifting and lowering portion 50 is a device for displacing the entire support portion 21 in the vertical direction. As a specific example of the lifting and lowering portion 50, there is a hydraulic cylinder which is driven by an external drive source, or the like. By operating the lifting and lower portion 50, the support portion 21 can be lifted and lowered in the vertical direction in a state where the upper surface thereof (placement surface S) is maintained so as to be approximately horizontal.

In a case where the support portion 21 moves downward (is lowered), the tire on the placement surface S also moves downward according to the downward movement of the support portion 21. Here, as described above, the two belt portions 23 of the support portion 21 are separated from each other in the direction orthogonal to the transport direction. Accordingly, according to the lowering of the support portion 21, the lower rim BR held below the support portion 21 is exposed from a gap between the two belt portions 23 toward the above of the gap. Accordingly, the lower rim BR comes into contact with and is fitted to the tire T on the upper side (that is, placement surface S) of the belt portion 23.

(Position Detection Unit 40)

In the present embodiment, the position detection unit 40 is provided integrally with the support portion 21 (support portion main body 22). The position detection unit 40 is a unit for detecting the position of the tire T when the rim R is fitted to the tire T according to the operation of the lifting and lowering portion 50. For example, as the position detection unit 40, a unit capable of detecting a separation distance between the unit and an object or the position of the object in a non-contact state such as a laser distance meter or an ultrasonic distance meter is suitably used.

In the present embodiment, four position detection units 40 are provided in the support portion main body 22. As shown in FIGS. 1 and 2, the position detection units 40 are provided below the placement surface S in the support portion 21 and in a region corresponding to a portion between the belt portions 23. In order words, the position detection units 40 are provided in the region of one side in the tire axis OT direction.

In addition, when viewed from the tire axis OT direction, the four position detection units 40 are provided in a region inside a contour line (outer diameter) of the tire T and outside the outer diameter of the rim R. That is, the rim R is not irradiated with laser beams or ultrasonic waves emitted from the position detection units 40, and only the surface (mainly, the side wall) of the tire T is irradiated with the laser beams or ultrasonic waves. Particularly, all the position detection units 40 are configured such that the surface of the tire is irradiated with laser beams or ultrasonic waves approximately in the vertical direction. Points on the surface of the tire T irradiated with laser beams or ultrasonic waves are referred to as detection points P. That is, in the present embodiment, four detection points P corresponding to four position detection units 40 are set.

In addition, as described above, the separation distance between the pair of belt portions 23 in the support portion 21 can be appropriately adjusted according to dimensions of the tire T and the rim R. According to this configuration, with respect to the tire T and rim R of any dimension, the position detection units 40 can be positioned at the above-described position (that is, the region inside the outer diameter of the tire T and outside the outer diameter of the rim R).

During the lifting and lowering movements of the support portion 21 performed by the lifting and lowering portion 50, the position detection units 40 configured as described above continuously and intermittently detect a separation distance L (position information L) from the position detection units 40 to the surface of the tire T in the vertical direction. That is, in a state where the tire T is placed on the support portion 21 (on the placement surface S), the separation distance which is detected by the position detection unit 40 becomes L1 as an initial value (refer to FIG. 7A or the like).

Meanwhile, in a case where the tire T is displaced in the vertical direction by an external force or the like, that is, in a case where the tire T is separated upward from the placement surface S, or the like, the separation distance L detected by the position detection unit 40 gradually increases from the above initial value L1. The position information L is temporarily stored in the posture detection unit 60 (described below) as an electric signal.

(Posture Detection Unit 60)

The posture detection unit 60 is a unit which detects a change in a posture of the tire T based on a change of the separation distance L for each detection point detected by the position detection unit 40, and determines whether the posture is a normal posture or an abnormal posture. More specifically, the posture detection unit 60 according to the present embodiment includes a difference calculation unit 61 and a determination unit 62.

The difference calculation unit 61 calculates a difference (change) of the separation distances L for each detection point P before and after a relative movement between the tire T and the rim R according to the lowering of the support portion 21. The determination unit 62 determines normality or abnormality in the posture of the tire T based on the difference.

A detailed operation of the posture detection unit 60 and an operation of the tire inspection device 10 are described. First, a case where the tire T is in a normal posture is described with reference to FIGS. 3, 4, and 7A.

Figure 3:
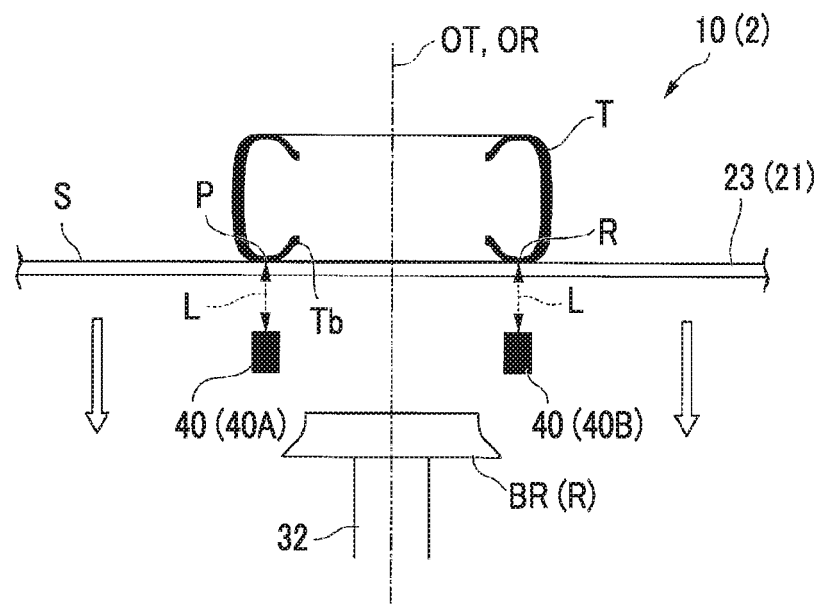
FIG. 3 is a view showing an example of an operation of a tire inspection device according to a first embodiment of the present invention.
Figure 4:
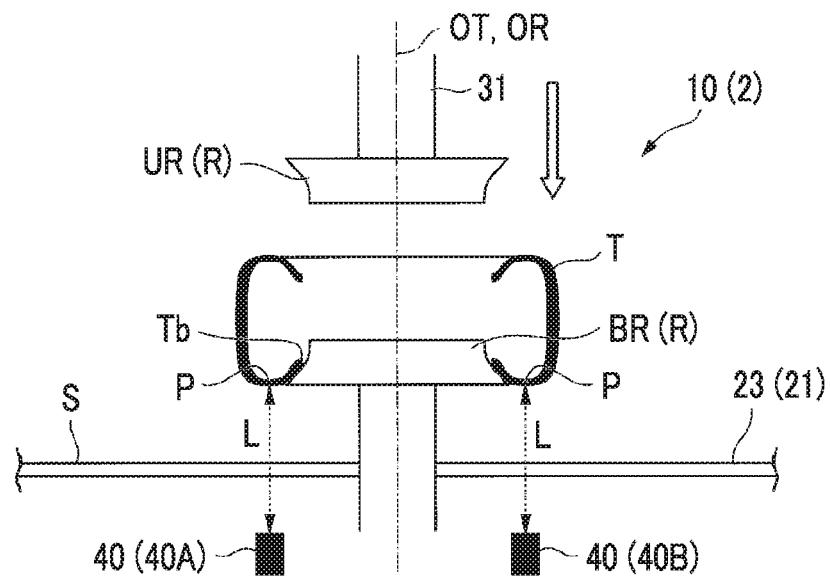
FIG. 4 is a view showing an example of the operation of the tire inspection device according to the first embodiment of the present invention.

FIG. 3 shows a state where the tire T is carried in the support portion 21 (placement surface S) via the carrying-in portion 1. In this state, each of the upper spindle 31 and the lower spindle 32 is positioned with a gap from the tire T on the support portion 21 in the vertical direction. In addition, the tire axis OT and the rim axis OR are positioned on the same line as each other.

Initially, the lower rim BR is fitted to the tire T in the above state. Specifically, first, the entire support portion 21 is lowered by the lifting and lowering portion 50. That is, the tire T on the support portion 21 starts the relative movement with respect to the lower rim BR. At this time, the position (position of the detection point P) of the tire T detected by the position detection unit 40 shows the change of FIG. 7A (corresponding to a position detection step in FIG. 8). In addition, in FIG. 3, only two position detection units are shown. Moreover, the position detection unit 40 shown on the left is referred to as a first position detection unit 40A, and the position detection unit 40 shown on the right is referred to as a second position detection unit 40B.

Figure 7A:
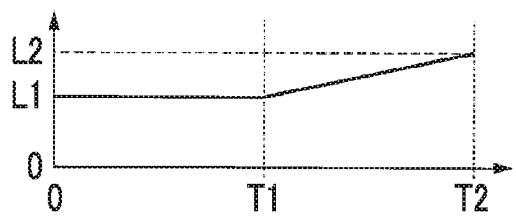
FIG. 7A is a graph showing a temporal change of position information for each detection point in the tire inspection device according to the first embodiment of the present invention.
Figure 7B:
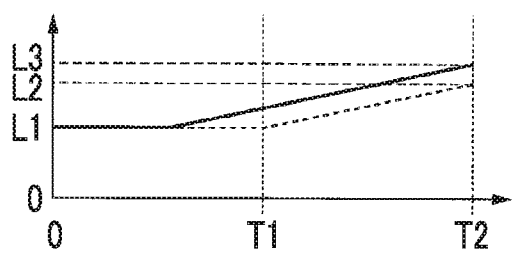
FIG. 7B is a graph showing the temporal change of the position information for each detection point in the tire inspection device according to the first embodiment of the present invention.
Figure 7C:
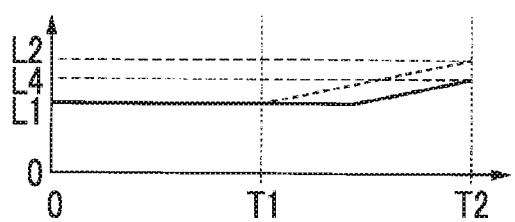
FIG. 7C is a graph showing the temporal change of the position information for each detection point in the tire inspection device according to the first embodiment of the present invention.

FIG. 7 (FIGS. 7A to 7C) is a graph in which the positions of the detection points P in the plurality of position detection units 40 are shown in a vertical axis and time from starting of fitting between the tire T and the rim R to completion of the fitting is shown in a horizontal axis. Time T1 in the horizontal axis indicates a time when the tire T (support portion 21) having a normal posture and the rim R come into contact with each other. Time T2 indicates a time when the fitting between the tire T having a normal posture and the rim R is completed (that is, the lowest position of the tire T in the lowering of the support portion 21).

The tire T is supported by the support portion 21 in a substantially stationary state between starting of the lowering of the support portion 21 and the time T1. Here, in a case where the plurality of detection points P are coaxially disposed with respect to the tire axis O on the tire T, the position information L in the detection points P acquires approximately the same value L1 as each other. Meanwhile, in a case where the plurality of detection points P are not coaxially disposed with respect to the tire axis O, the position information L in the detection points P has a value slightly different from the value L1 before and after the value L1 according to the shape (curved shape or the like) of the side wall of the tire. (the example of FIG. 7A shows the change of the position information L in the former state).

Subsequently, when time reaches the time T1, the lower rim BR and the tire T come into contact with each other. Similarly to the example of FIG. 3, in the case where the tire axis OT and the rim axis OR are positioned at the same line as each other (that is, in a case where misalignment between the tire T and the rim R does not occur, or in a case where the misalignment is so small as to be ignorable), the position of the detection point P is indicated by a transition shown by a solid line from the time T1 to the time T2 in FIG. 7A. That is, the position information L in the first position detection unit 40A and the second position detection unit 40B monotonically increases so as to have the same inclination as each other.

That is, in a case where the misalignment between the tire T and the rim (lower rim BR) does not occur, after the lower rim BR comes into contact with the tire T, the lower rim BR is smoothly fitted to the bead portion Tb. Until the fitting is completed after the lower rim BR comes into contact with the tire T, an approximately horizontal state of the tire T on the support portion 21 (on the placement surface S) is maintained. Accordingly, the change of the position information L in each detection point of the tire T is approximately the same as each other.

The difference (change) of the position information L in each detection point P is calculated by the above-described difference calculation unit 61 (difference calculation step). More specifically, the difference calculation unit 61 calculates a difference (L2−L1) between the position information L2 of each detection point P at the time T2 and the position information L1 of each detection point P at times O to T1. That is, in the case where the misalignment between the tire axis OT and the rim axis OR does not occur, at the time (time T2) when the fitting between the rim R and the tire T is completed, the difference having approximately the same value as each other is obtained.

Subsequently, the difference calculated by the difference calculation unit 61 is input to the determination unit 62. The determination unit 62 compares a predetermined reference value and the value of the difference. In a case where the difference of the position information L for each detection point P is smaller than the reference value, the determination unit 62 determines that the posture of the tire T is normal and generates a normal signal as posture information. According to this normal signal, the operation of the tire inspection device 10 is continued.

As described above, in the case where the tire T and the rim R are coaxially positioned relative to each other, the operation of the tire inspection device 10 and each process of the tire posture detection method are completed.

Figure 5:
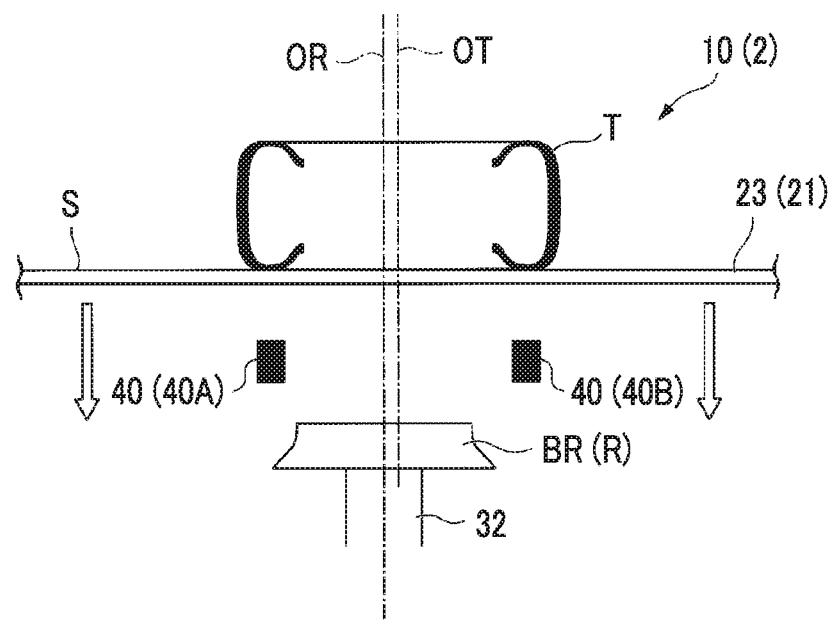
FIG. 5 is a view showing a state where misalignment between the tire and a rim occurs in the tire inspection device according to the first embodiment of the present invention.

Meanwhile, in a case where the tire inspection device 10 is continuously operated for a long period, as shown in FIG. 5, a state where the misalignment between the tire T placed on the support portion 21 and the rim R occurs due to external factors such as vibration or sliding is assumed. More specifically, a state where the tire axis OT and the rim axis OR are not positioned at the same line as each other is assumed. If the lower rim BR and the upper rim UR are fitted to the tire T in a state where the misalignment occurs, for example, the bead portion Tb of the tire T rides on the lower rim BR. Accordingly, inclination of the tire T with respect to the horizontal surface is generated. Moreover, in a case where the upper rim UR is fitted to the tire T, since the tire T is interposed between the lower rim BR and the upper rim RU, quality in the tire is likely to be influenced.

In order to avoid the occurrence of the above-described circumstance, in the tire inspection device 10 according to the present embodiment, the position of the tire T (detection point P) in the vertical direction and presence or absence (change in the posture) of the inclination based on the position are detected by the position detection unit 40 and the posture detection unit 60.

Figure 6:
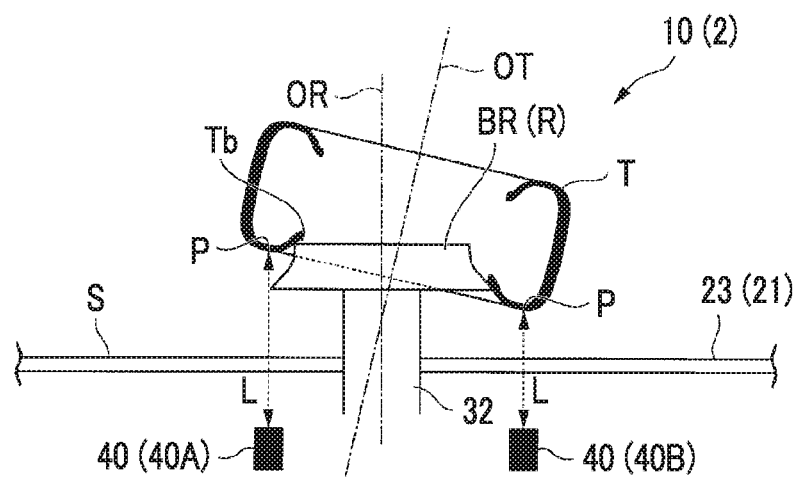
FIG. 6 is a view showing a state where the tire and the rim are fitted to each other in the tire inspection device according to the first embodiment of the present invention.

More specifically, as shown in FIG. 6, in the state where the tire T rides on the lower rim BR, the position of one detection point P in the vertical direction is positioned above the other detection point P (Even when only two detection points are shown in FIG. 6, in reality, four detection points P are displaced at positions different from one another).

In this state, as an example, the position of the detection point P detected by the position detection unit 40 is changed as shown in solid graphs of FIGS. 7B and 7C. In addition, each graph of FIGS. 7B and 7C indicates the change of the position information L in each of the above-described first position detection unit 40A and second position detection unit 40B. That is, the examples of FIGS. 5 and 6 show a state where the tire axis OT is deviated to the first position detection unit 40A side with respect to the rim axis OR. Hereinafter, representatively, the changes in two detection points P corresponding to the two position detection units are described.

In the above state, first, the bead portion Tb on the first position detection unit 40A side comes into contact with the rim R (lower rim BR). Subsequently, according to the lowering of the support portion 21, the bead portion Tb rides on the lower rim BR.

At this time, as shown in FIG. 7B, the position information L detected by the first position detection unit 40A is changed to an increase before the time reaches the time T1. Meanwhile, as shown in FIG. 7C, the position information L detected by the second position detection unit 40B is changed to an increase after the time T1 elapses.

Accordingly, when the time reaches the time T2, the position information in the detection point P corresponding to the first position detection unit 40A becomes L3. The value L3 becomes a value which is larger than L2 in the above-described normal state (refer to FIG. 7A) (L3>L2). Meanwhile, the position information in the detection point P corresponding to the second position detection unit 40B becomes L4. The value L4 is a value which is smaller than the value L2 (L4<L2).

In the difference calculation unit 61, the difference is calculated based on the above-described values (values L1, L3, and L4 as the position information L). More specifically, the difference (L3−L1) of the position information L in the first position detection unit 40A, and the difference (L4−L1) of the position information L in the second position detection unit 40B are respectively calculated.

Next, the differences calculated by the difference calculation unit 61 are input to the determination unit 62. The determination unit 62 compares the predetermined reference values with the difference values. In a case where the difference of the position information L for each detection point P is smaller than the reference value, the determination unit 62 determines that the posture of the tire T is normal. Specifically, each of the value of L3−L1 and the value of L4−L1 is compared with the reference value, and in a case where any one of the values is smaller than the reference value, it is determined that the posture of the tire T is normal.

Meanwhile, out of the differences, in a case where at least one difference (in a case where four position detection units 40 are provided, at least one difference) is larger than the reference value, the determination unit determines that inclination occurs in the tire T and generates an abnormal signal as the position information. Similarly to the normal signal, the abnormal signal is informed to an operator via an interface (not shown), alarm (not show), or the like. The operator who senses the abnormal signal stops the tire inspection device 10, and removes the tire T having the abnormal posture or restores the tire T to a normal posture. In addition, when the reference value is determined, even in a case where the difference value exceeds the reference value, it is preferable to appropriately select the reference value by which the upper rim UR can stop at a height at which the fitting of the upper rim UR with respect to the tire T is not completed.

Hereinbefore, in the case where the misalignment between the tire T and the rim R occurs, the operation of the tire inspection device 10 and each process of the tire posture detection method are completed.

As described above, in the tire inspection device 10 and the tire posture detection method according to the present embodiment, since the position detection units 40 are provided in the region on the one side in the center axis direction of the tire T, when the tire T and the rim R are relatively moved to each other by the lifting and lowering portion 50, it is possible to detect the position information L of the tire T in the vertical direction with high accuracy. In addition, since the position detection unit 40 can detect the position information L in a state where the position detection units 40 do not come into contact with the detection points P of the tire T, even while the tire T and the rim R move relative to each other, it is possible to appropriately detect the position information L.

In addition, according to the configuration, the position detection units 40 are provided in the region which is positioned inside the outer circumferential edge of the tire T and outside the outer circumferential edge of the rim R. In addition, based on this position, the position information L of the detection points P on the side wall of the tire T is detected by the position detection units 40. Accordingly, the position detection units 40 can detect the positional change of the tire T in the vertical direction with higher accuracy.

In addition, according to the above-described device and method, displacement (difference) occurs in the position of the tire T with respect to the position detection unit 40 as the tire T is fitted to the rim R by the relative movement between the rim R and the tire T on the support portion 21. The difference calculation unit 61 calculates the difference of the position information L at three or more detection points P before and after the relative movement. The determination unit 62 compares the difference with the reference value. In the case where the difference of the position information L for each detection point P is smaller than the reference value, it can be determined that the detection points P (that is, the surface of the tire T) are positioned at substantially equal distances from the position detection units 40. Accordingly, the determination unit 62 determines that inclination does not occur in the tire T, and generates a normal signal as the posture information of the tire T.

Meanwhile, in the case where the difference is greater than the reference value, it is determined that a change in the posture of the tire T such as inclination occurs in the tire T when the rim R and the tire T are fitted to each other. Accordingly, the determination unit 62 determines that the tire T is in an abnormal posture, and generates an abnormal signal as the posture information of the tire T.

Accordingly, in the case where deviation between the tire axis OT and the rim axis OR on the support portion 21 occurs, an abnormal signal occurs by detecting inclination of the tire T occurring due to the deviation. The abnormal signal can urge an operator to perform countermeasures such as stopping of the tire inspection device 10, restoration in the posture of the tire T, or removal of the tire T. Accordingly, it is possible to decrease the possibility of inappropriate fitting between the tire T and the rim R.

Hereinbefore, the first embodiment of the present invention is described with reference to the drawings. However, various modifications may be applied to the above-described configuration and method within a scope which does not depart from the gist of the present invention.

For example, in the above-described embodiment, the position change of four detection points P on the surface of the tire T is detected by providing four position detection units 40 on the surface of the tire T. However, in order to detect the inclination of the tire T with respect to the support portion 21 (placement surface S), it is sufficient if the positions are detected at three or more detection points P. That is, it is possible to provide only three position detection units 40.

In addition, in the embodiment, the posture change of the tire T is detected based on the difference of the position information L of the detection points P corresponding to the position detection units 40. However, the posture change of the tire T may be detected based on a time change rate (that is, inclination of the straight line in each graph of FIG. 7) of the position information L. In other words, in the difference calculation unit and the difference calculation step, the change rate in the changes of the position information L in each graph shown in FIG. 7 is calculated, and in the subsequent determination unit and determination step, the posture change of the tire T may be detected by comparing the change rate with a predetermined reference value. In a case where this configuration is adopted, if it is detected that the change rate of the position information L at one or more detection points P exceeds the reference value, it can be determined that the tire T is in an abnormal posture.

In addition, in the above-described embodiment, all the position detection units 40 are installed on a portion of the support portion 21. However, the aspect of the position detection unit 40 is not limited to this, and for example, the position detection unit 40 may be provided on the upper spindle 31. Even when this configuration is adopted, it is possible to detect the change in the posture of the tire T based on the separation distance between the tire T and the position detection unit 40.

In addition, in the above-described embodiment, in the tire inspection device 10, the tire T is fitted to the lower rim BR on the lower spindle 32 by lowering the support portion 21. However, the aspect of the tire inspection device 10 is not limited to this. For example, the support portion 21 is supported and fixed at a constant height, and the tire T and the rim R may be fitted to each other by lifting and lowering the lower spindle 32. Even when this configuration is adopted, similarly to the above-described configurations, it is possible to detect the change in the posture of the tire T based on the separation distance between the tire T and the position detection unit 40.

In addition, in the above-described embodiment, the example in which a belt conveyor is adopted as the support portion 21 is described. However, the aspect of the support portion 21 is not limited to the belt conveyor. For example, a plurality of rollers which are arranged in a transport direction may be adopted as the support portion 21. More specifically, the plurality of rollers are rotatably supported around each rotation axis on a horizontal surface intersecting the transport direction. Even when this configuration is adopted, it is possible to transport the tire T on the rollers. The point is that any device may be used as the support portion 21 as long as it is a device capable of stably transporting the tire T while supporting the tire T from the lower side.

Second Embodiment

Next, a tire inspection device 10 and a tire posture detection method according to a second embodiment of the present invention are described with reference to FIGS. 9 to 13. In addition, the same reference numerals are assigned to the configurations similar to those of the first embodiment, and detailed descriptions thereof are omitted.

As shown in FIG. 9, in the tire inspection device 10 according to the present embodiment, the position detection units 40 are fixed to positions separated from the support portion 21. Specifically, in the example of FIG. 9, the position detection units 40 are disposed on a substantially horizontal floor surface. In addition, the position detection units do not necessarily need to be disposed on the floor surface, and the point is that the position detection units may be disposed at any position including a base frame (not shown) or the like of the tire inspection device 10 as long as the position units are fixed at positions independent of the support portion 21.

Figure 10:
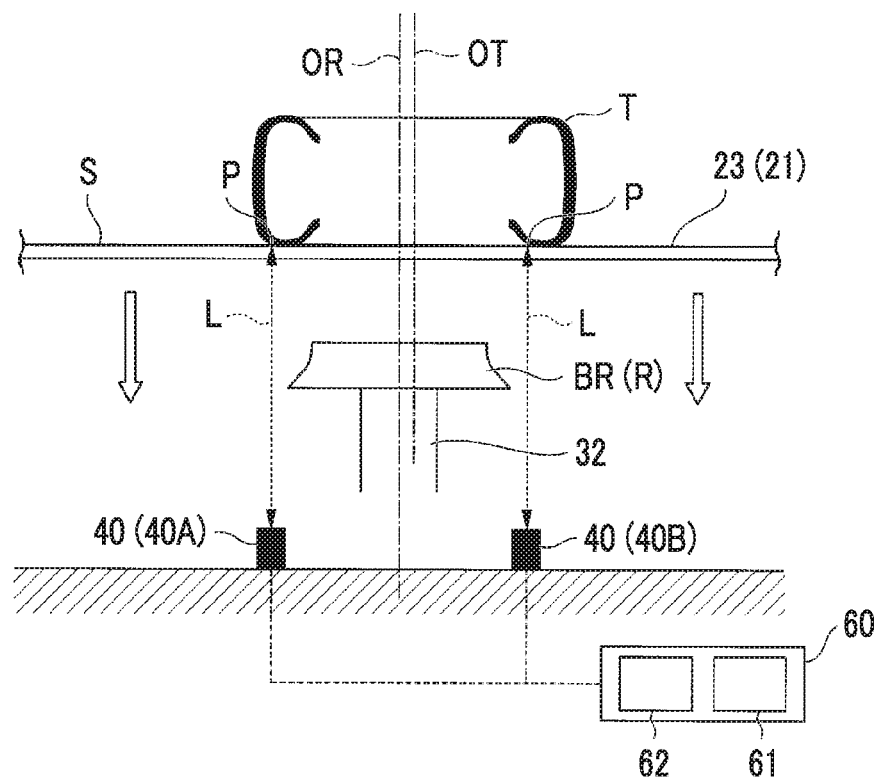
FIG. 10 is a view showing a state where misalignment between the tire and the rim occurs in the tire inspection device according to the second embodiment of the present invention.
Figure 11:
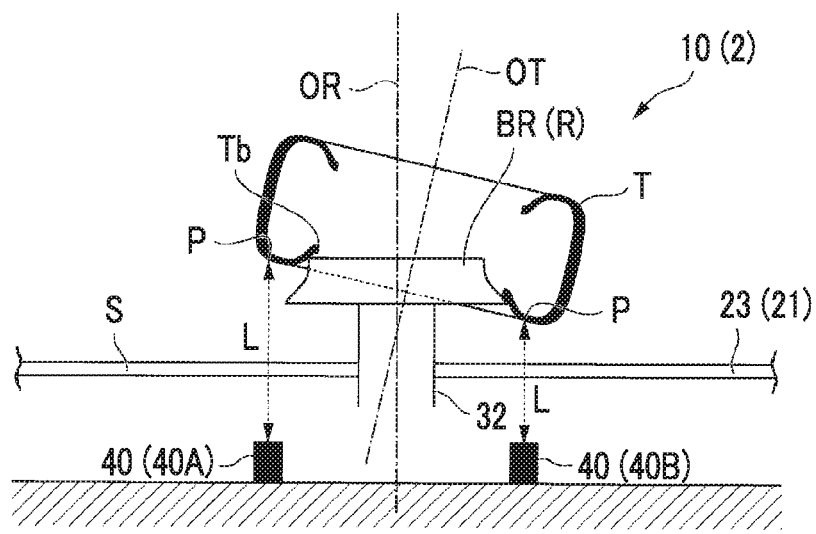
FIG. 11 is a view showing a state where the tire and the rim are fitted to each other in the tire inspection device according to the second embodiment of the present invention.
Figure 12A:
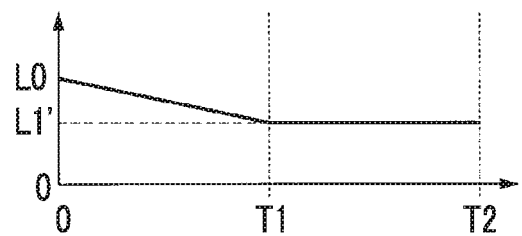
FIG. 12A is a graph showing a change of position information for each detection point in the tire inspection device according to the second embodiment of the present invention.

In a case where this configuration is adopted, according to the lifting (lowering) of the support portion 21, the distance (position information L) between each position detection unit 40 and the detection point P of the tire T gradually decreases. That is, in a case where the tire axis OT and the rim axis OR are positioned at the same line as each other, as shown in FIG. 12A, the position information L (separation distance L) of each detection point P continuously decreases from the initial value L0 until the tire T and the lower rim BR come into contact with each other at the time T1. After the time T1 elapses, since the tire T is held on the lower rim BR, the position information L becomes a substantially constant value L1'. Meanwhile, in a case where the tire axis OT and the rim axis OR are not positioned at the same straight line as each other (in a case where misalignment between the tire T and the lower rim BR occurs), as shown in FIGS. 10 and 11, the tire T rides on the lower rim RB.

Figure 12B:
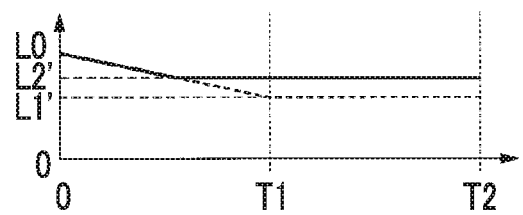
FIG. 12B is a graph showing the change of the position information for each detection point in the tire inspection device according to the second embodiment of the present invention.
Figure 12C:
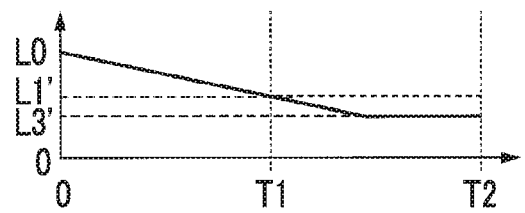
FIG. 12C is a graph showing the change of the position information for each detection point in the tire inspection device according to the second embodiment of the present invention.

At this time, as an example, the position for each detection point P in the vertical direction is changed as shown in FIGS. 12B and 12C. First, the bead portion Tb on the first position detection unit 40A side comes into contact with the rim R (lower rim BR). Subsequently, according to the lowering of the support portion 21, the bead portion Tb rides on the lower rim BR. At this time, as shown in FIG. 12B, the position information L detected by the first position detection unit 40A becomes a constant value L2' before it reaches the time T1. Meanwhile, as shown in FIG. 12C, the position information L detected by the second position detection unit 40B becomes a constant value L3' after the time T1 elapses.

Accordingly, when the time reaches the time T2 (when the support portion 21 is lowered to the lowest point), the value of the position information L in the detection point P corresponding to the first position detection unit 40A becomes L2', and the value of the position information L in the detection point P corresponding to the second position detection unit 40B becomes L3'. The value L2' becomes a value which is larger than L1' (refer to FIG. 12A) in the above-described normal state (L2'>L1'). Meanwhile, the value L3' becomes a value which is smaller than the value L1' (L3'<L1').

In the difference calculation unit 61, the difference is calculated based on the above-described values (values L0, L2', and L3' as the position information L). More specifically, the difference (L2'−L0) of the position information L in the first position detection unit 40A, and the difference (L3'−L0) of the position information L in the second position detection unit 40B are respectively calculated.

Next, the differences calculated by the difference calculation unit 61 are input to the determination unit 62. The determination unit 62 compares the predetermined reference values with the difference values. As described above, in a case where the difference amount of the position information L for each detection point P is smaller than the reference value, the determination unit 62 determines that the posture of the tire T is normal. Specifically, each of the value of L2'−L0 and the value of L3'−L0 is compared with the reference value, and in a case where any one of the values is smaller than the reference value, it is determined that the posture of the tire T is normal.

Meanwhile, out of the differences, in a case where at least one difference (in a case where four position detection units 40 are provided, at least one difference) is larger than the reference value, the determination unit determines that inclination occurs in the tire T and generates an abnormal signal as the position information. Similarly to the normal signal, the abnormal signal is informed to an operator via an interface (not shown), alarm (not shown), or the like. The operator who senses the abnormal signal stops the tire inspection device 10, and removes the tire T having the abnormal posture or restores the tire T to a normal posture. Hereinbefore, in the case where the misalignment between the tire T and the rim R occurs, the operation of the tire inspection device 10 and each process of the tire posture detection method are completed.

As described above, in the tire inspection device 10 according to the present embodiment, since the position detection units 40 are fixed at the positions separated from the support portion 21, when the support portion 21 is lifted and lowered (that is, when the tire T and the rim R move relative to each other), the position of the detection pint P on the surface of the tire T is temporarily changed. The difference calculation unit 61 calculates the difference (change) of the position information L. In the determination unit 62, it is possible to determine the posture of the tire T based on the difference before and after the relative movement between the rim R and the tire T. Specifically, in a case where the differences of the position information L for each detection point P are the same as each other, the determination unit 62 determines that the tire T is in a normal posture and generates a normal signal as the posture information.

Meanwhile, in a case where the differences of the position information L for each detection point P are not the same as each other, when the rim R and the tire T are fitted to each other, it is determined that a change in the posture such as inclination occurs in the tire T. Accordingly, the determination unit 62 determines that the tire T is in an abnormal posture, and generates an abnormal signal as the posture information of the tire T. Therefore, similarly to the first embodiment, it is possible to decrease the possibility of inappropriate fitting between the tire T and the rim R.

In addition, in the embodiment, the example in which all the position detection units 40 are fixed to the floor surface (the lower region when viewed from the tire T) or a base frame (not shown) is described. However, the positions of the position detection unit 40 are not limited to the above-described position, and for example, a configuration in which the position detection unit 40 is supported and fixed to a region above the support portion 21 may be adopted. In this case, each detection point P is set to the upper side wall of the tire T. Even when this configuration is adopted, it is possible to determine the posture of the tire T based on the difference of the positions for each detection point P.

In addition, in the above-described embodiments, as an example, the device and the method which detect the posture change of the tire T in the tire inspection device are described. However, as long as the device is a device having a structure in which the rim R is fitted to the tire T in an upward-downward direction such as a Post Cure Inflator (PCI) of a tire vulcanizing machine instead of the tire inspection device 10, or the method is a method including similar processes, the present invention may be applied to any object.

INDUSTRIAL APPLICABILITY

The above-described tire inspection device 10 and the tire posture detection method can be applied to quality inspection in a manufacturing process of the tire T or the like.

REFERENCE SIGNS LIST

1 . . . carrying-in portion, 2 . . . inspection portion, 3 . . . carrying-out portion, 10 . . . tire inspection device, 21 . . . support portion, 22 . . . support portion main body, 23 . . . belt portion, 24 . . . roller portion, 31 . . . upper spindle, 32 . . . lower spindle, 40 . . . position detection unit, 50 . . . lifting and lowering portion, 60 . . . posture detection unit, 61 . . . difference calculation unit, 62 . . . determination unit, 80 . . . air inflator, BR . . . lower rim, L . . . position information, OR . . . rim axis, OT . . . tire axis, P . . . detection point, R . . . rim, S . . . placement surface, T . . . tire, Tb . . . bead portion, UR . . . upper rim

The invention claimed is:
1. A tire inspection device, comprising:
a support portion which supports a tire such that a center axis of the tire is positioned along a vertical direction;

a lifting and lowering portion which moves the tire and a rim relative to each other in the vertical direction to fit the rim to the tire;

a position detection unit which detects a position of a surface of the tire in the vertical direction at three or more detection points; and a posture detection unit which detects posture information of the tire based on position information detected by the position detection unit, wherein the position detection unit is integrally provided with the support portion, and wherein the posture detection unit includes:

a difference calculation unit which calculates a difference of the position information for each detection point before and after relative movement between the tire and the rim; and a determination unit which compares the difference for each detection point and a predetermined reference value with each other, determines that the tire is in a normal posture in a case where the difference is smaller than the reference value and generates a normal signal as the posture information, and determines that the tire is in an abnormal posture in a case where the difference is greater than the reference value and generates an abnormal signal as the posture information.

2. The tire inspection device according to claim 1, wherein the position detection unit is provided in a region on one side in the center axis direction of the tire, and detects the position information in a state where the position detection unit does not come into contact with the detection point.

3. The tire inspection device according to claim 1, wherein when viewed from the vertical direction, the position detection unit is provided at a position which is positioned inside an outer circumferential edge of the tire and outside an outer circumferential edge of the rim, and wherein the detection point is positioned on a side wall which is a surface facing the center axis direction in the tire.

4. A tire inspection device, comprising:

a support portion which supports a tire such that a center axis of the tire is positioned along a vertical direction;

a lifting and lowering portion which moves the tire and a rim relative to each other in the vertical direction to fit the rim to the tire;

a position detection unit which detects a position of a surface of the tire in the vertical direction at three or more detection points; and a posture detection unit which detects posture information of the tire based on position information detected by the position detection unit, wherein the position detection unit is fixed at a position which is separated from the support portion and is different from the position of the support portion, and wherein the posture detection unit includes:

a difference calculation unit which calculates a difference of the position information for each detection point before and after relative movement between the tire and the rim; and a determination unit which compares the difference for each detection point and a predetermined reference value with each other, determines that the tire is in a normal posture in a case where the difference is smaller than the reference value and generates a normal signal as the posture information, and determines that the tire is in an abnormal posture in a case where the difference is greater than the reference value and generates an abnormal signal as the posture information.

5. A tire posture detection method, which detects a posture change of a tire when the tire supported by a support portion such that a center axis of the tire is positioned along a vertical direction, and a rim fitted to the tire move relative to each other in the vertical direction, by a position detection unit which is provided integrally with the support portion, comprising:

a step of detecting a plurality of position information by detecting a separation distance between the tire and the position detection unit during the relative movement at three or more detection points on the tire;

a step of calculating a difference between the plurality of position information for each detection point before and after the relative movement; and a step of comparing the difference for each detection point and a predetermined reference value with each other, determining that the tire is in a normal posture in a case where the difference is smaller than the reference value, and determining that the tire is in an abnormal posture in a case where the difference is greater than the reference value.

6. A tire posture detection method, which detects a posture change of a tire when the tire supported by a support portion such that a center axis of the tire is positioned along a vertical direction, and a rim fitted to the tire move relative to each other in the vertical direction, by a position detection unit which is provided at a position which is separated from the support portion and is different from the position of the support portion, comprising:

a step of detecting a plurality of position information by detecting a separation distance between the tire and the position detection unit during the relative movement at three or more detection points on the tire;

a step of calculating a difference between the plurality of position information for each detection point before and after the relative movement; and a step of comparing the difference for each detection point and a predetermined reference value with each other, determining that the tire is in a normal posture in a case where the difference is smaller than the reference value, and determining that the tire is in an abnormal posture in a case where the difference is greater than the reference value.

* * * * *